United States Patent [19]
Yamato

[11] Patent Number: 5,889,761
[45] Date of Patent: Mar. 30, 1999

[54] METHOD AND SYSTEM FOR CONTROLLING CELL TRANSMISSION RATE IN ATM NETWORK USING RESOURCE MANAGEMENT CELL

[75] Inventor: Katsumi Yamato, Saitama-ken, Japan

[73] Assignee: Kabushiki Kaisha Toshiba, Kawasaki, Japan

[21] Appl. No.: 619,353

[22] Filed: Mar. 21, 1996

[30] Foreign Application Priority Data

Mar. 24, 1995 [JP] Japan ................................. 7-065892

[51] Int. Cl.$^6$ ................................. H04J 1/16; H04J 3/14
[52] U.S. Cl. ................................. 370/231; 370/236
[58] Field of Search ................................. 370/229–236, 370/253, 395–399

[56] References Cited

U.S. PATENT DOCUMENTS 5,546,377  8/1996  Ozveren ................................. 370/13

OTHER PUBLICATIONS

Bonomi et al., "The Rate–Based Flow Control Framework For The Available Bit Rate ATM Service", *IEEE Network*, pp. 25–39, (1995).

Berger et al., "Proposed TM Baseline Text On An ABR Conformance Definition", *ATM Forum Contribution* 95 212(RI), pp. 76–89, (1995).

Roberts, "Enhanced PCRA (Proportional Rate–Control Algorithm)", *ATM Forum Contribution* 95–735(RI), pp. 1:11, (1994).

The ATM Forum User–Network Interface (UNI) Specification Version 3.1: (Sep. 1994).

*Primary Examiner*—Douglas W. Olms
*Assistant Examiner*—David R. Vincent
*Attorney, Agent, or Firm*—Foley & Lardner

[57] ABSTRACT

A cell transmission rate control scheme in ATM network, capable of preventing incorrect updating of information in a resource management (RM) cell. The RM cell having an explicit cell rate field is transmitted and returned between the first and second end-nodes. A first cell transmission rate value written in the explicit cell rate field of the RM cell transmitted by the first end-node is stored at a control unit provided on the ATM network, and a second cell transmission rate value written in the explicit cell rate field of the RM cell returned by the second end-node is detected at the control unit. When the second cell transmission rate value is larger than the first cell transmission rate value, the second cell transmission rate value is rewritten into the first cell transmission rate value in the explicit cell rate field of the RM cell returned by the second end-node at the control unit.

39 Claims, 9 Drawing Sheets

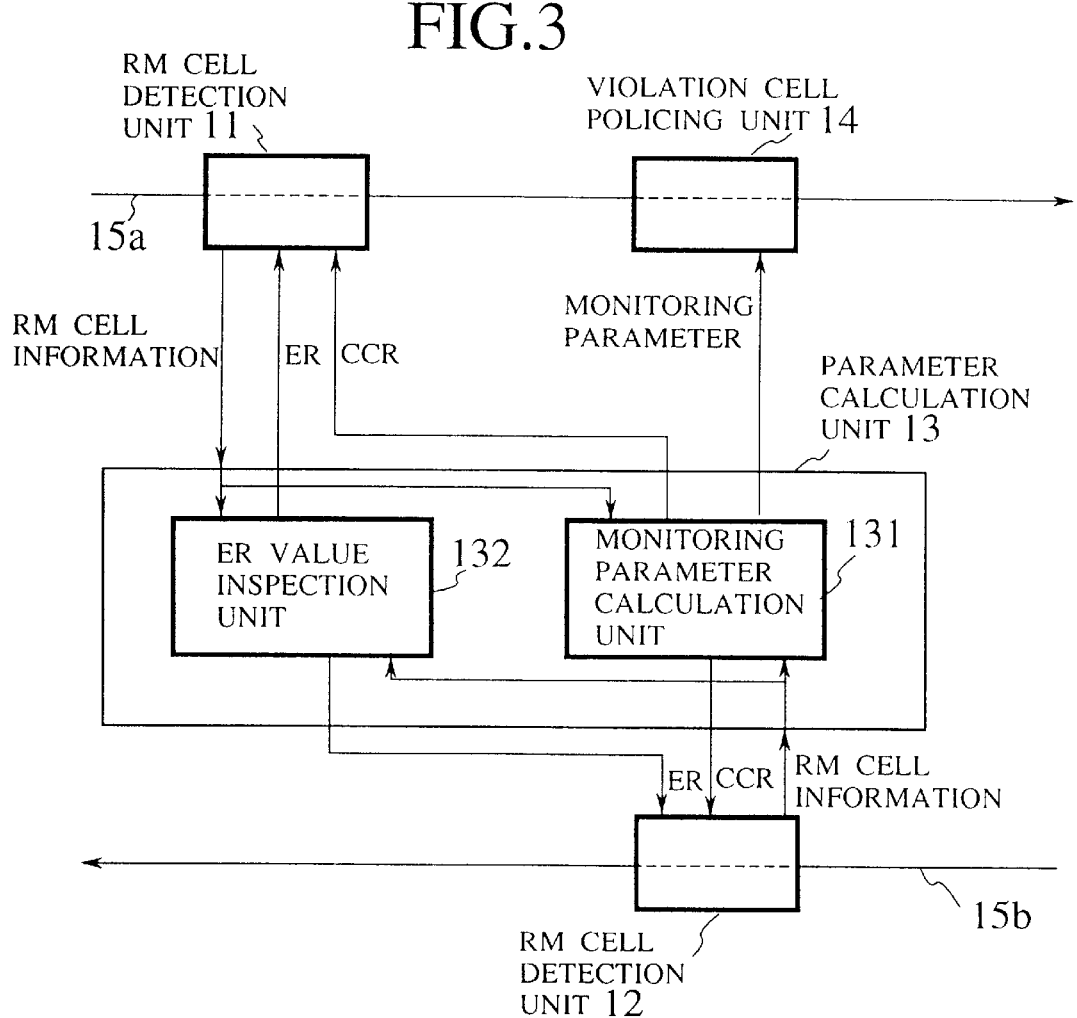
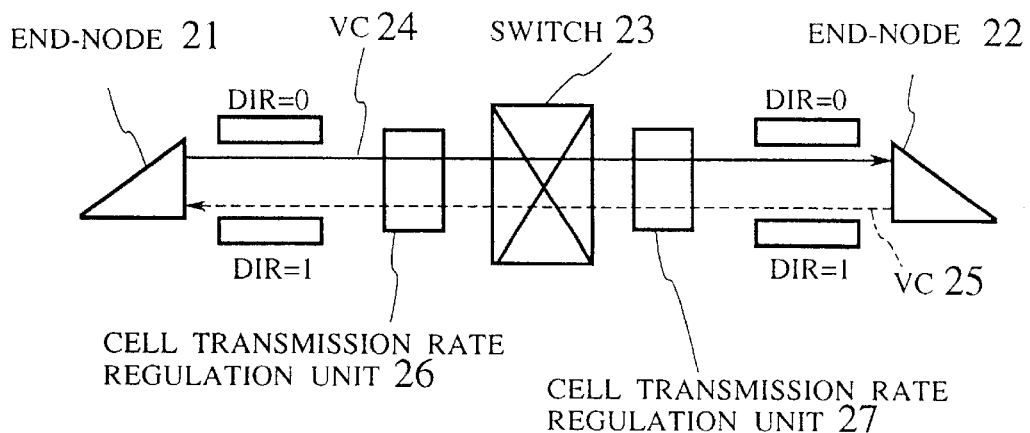

METHOD AND SYSTEM FOR CONTROLLING CELL TRANSMISSION RATE IN ATM NETWORK USING RESOURCE MANAGEMENT CELL

BACKGROUND OF THE INVENTION

1. Field of the Invention

The present invention relates to a method and a system for controlling a transmission rate of fixed length packets, called cells, which are transferred in an ATM (Asynchronous Transfer Mode) network.

2. Description of the Background Art

In a conventional data transfer utilizing the ATM network, when a user sets up a virtual connection between a source end-node and a destination end-node to carry out the data transfer, the following connection admission control is carried out. Namely, a user requests to a network in advance a desired quality of service (peak cell rate, average cell rate, etc.) for cell transmission, and a network which receives this request permits the connection set up only when the requested quality of service can be provided without adversely affecting the other network users and secures a bandwidth corresponding to the requested quality of service.

Also, at a time of cell transmission after the connection set up, the network monitors whether the cell transmission made by the terminal is in accordance with the quality of service requested at a time of the connection set up request, and when the cell transmission in violation of the requested quality of service is detected, the cells of the detected cell transmission are judged as violation cells, and the network applies a policing control to regulate the violation cells such as UPC/NPC (Usage Parameter Control/Network Parameter Control).

Presently, in the recent ATM Forum, there is a proposition for a new service called ABR (Available Bit Rate) service. In this ABR service, unlike the conventional service described above, a user requests a maximum cell rate (peak cell rate) and a minimum cell rate for the cell transmission at a time of the connection set up, but the cell transmission at the maximum cell rate is not always guaranteed at a time of the cell transmission by the user, although the cell transmission at the minimum cell rate is always guaranteed. In other words, in the ABR service, there is no need for the network to secure the bandwidth in correspondence to the requested connection. In this manner, it is possible for the ABR service to increase a number of simultaneously connected connections compared with the conventional service described above. As a consequence, there arises a possibility for an occurrence of a congestion at a switch in the network. Note that the congestion indicates a state in which it becomes impossible for a switch to provide a desired service as too many cells in excess of a prescribed processing power arrive at the switch. This terminology will be used throughout the following description.

In order to minimize an occurrence of the congestion at a switch in the ATM network, the ATM Forum has proposed a flow control algorithm called EPRCA (Enhanced Proportional Rate Control Algorithm) for realizing the ABR service (see, ATM Forum contribution 94-0735R1). In addition, the ATM Forum has specified source behaviour, destination behavior, and intermediate switch behavior in relation to this algorithm. According to this, the flow control to be made in conjunction with the ABR service operates according to an RM (Resource Management) cell.

FIG. 1 shows an exemplary format for the RM cell, which is in agreement with the format for an RM cell to be used at a time of providing the ABR service as determined by the TM (Traffic Management) working group of the ATM Forum. In this RM cell (53 octets) of FIG. 1, ATM header (5 octets) is a header similar to that of a usual cell, where a PT (Payload Type) field in this header has a value 8 in order to indicate that it is the RM cell. ID (1 octet) is a protocol identifier, which is always set to 0 by the source end-node. DIR (1 bit) is a direction identifier which is set to 0 if it is the RM cell transmitted from the source end-node to the destination end-node, or to 1 if it is the RM cell returned from the destination end-node to the source end-node. CI (1 bit) is a congestion indication, which is normally set to 0 (no congestion), but which is set to 1 when a congestion occurs at a switch unit in the network, CCR (2 octets) is a current cell transmission rate at the source end-node which is set by the source end-node. MCR (2 octets) is a minimum cell transmission rate determined at a time of the connection set up which is also set by the source end-node. ER (2 octets) is a maximum cell transmission rate determined at a time of the connection set up which is also set by the source end-node at a time of transmitting the RM cell, but which is overwritten by a value smaller than an original ER value according to the congestion state in the network when the RM cell is passing through the switch or returned at the destination end-node.

FIG. 2 shows an outline of the ABR service using the RM cell of FIG. 1. A configuration shown in FIG. 2 includes end-nodes 21 and 22 formed by terminals or switches for carrying out cell transmission and reception, a switch unit 23 connected between the end-nodes 21 and 22, and virtual connections 24 and 25 connecting between the end-nodes 21 and 22. Here, the virtual connection 24 is a connection to be used at a time of transferring cells from the end-node 21 to the end-node 22, and the virtual connection 25 is a connection to be used at a time of transferring cells from the end-node 22 to the end-node 21. In the following, regarding the end-node 21 as the source end-node and the end-node 22 as the destination end-node, the outline of the ABR service in a case of carrying out the data transfer from the end-node 21 to the end-node 22 will be described.

The end-node 21 transmits the usual data cells, while also transmitting the RM cell with a current cell transmission rate entered in the CCR (Current Cell Rate) field and the maximum cell transmission rate in the ER (Explicit cell Rate) field at predetermined regular intervals, to the end-node 22 via the same virtual connection 24 as used by the data cells. When this RM cell is received at the end-node 22, the DIR value of the received RM cell is changed to 1, and then the received RM cell is returned to the end-node 21 via the virtual connection 25.

When the switch 23 through which the virtual connection 24 for transferring the data cells is passing fell into the congestion state, the switch 23 is permitted to reduce the ER value of the RM cell transferred on the virtual connection 24 or 25 in order to indicate the congestion level at this switch 23, and/or to set up a CI (Congestion Indication) in the RM cell transferred on the virtual connection 25. Also, instead of reducing the ER value of the RM cell, the switch 23 which fell into the congestion state is permitted to set up an EFCI (Explicit Forward Congestion Indication) in the cell transferred on the virtual connection 24, so that the end-node 22 which received this cell can recognize the occurrence of the congestion and reduce the ER value of the RM cell there.

Then, the end-node 21 which received the RM cell returned at the end-node 22 reads out values in the CI field, the ER field, etc. of the RM cell, and changes the subsequent cell transmission rate according to these values.

In this manner, depending on a level of the congestion at the switch in the ATM network, the cell flow transmitted from the end-node 21 can be controlled, and as a result, it becomes possible to realize the recovery from the congestion according to this algorithm. Note that more than one switches may exist between the end-nodes 21 and 22.

Now, in the above described flow control algorithm, it is permitted for the ER value in the RM cell to be reduced by the end-node 22 or the switch 23 according to the congestion state. However, when the end-node 22 or the switch 23 increased the ER value in the RM cell by error due to malfunction, the ER field is going to have a value which is not reflecting the congestion state of the ATM network, and as a result, the end-node 21 determines the subsequent cell transmission rate on a basis of this erroneous ER value, so that there will be a possibility for the congestion to get worse.

In addition, the end-node 21 for transmitting cells is the only one which controls an amount of cells flowing into the network in response to the occurrence of the congestion in the ATM network, so that when the flow control algorithm execution unit within the end-node 21 fails to function normally, there will be no means for adjusting an amount of cells flowing into the network, and there will be a possibility for the switch in the ATM network to fall into a severe congestion, and a possibility for the quality of service of the other connections utilizing this same ATM network to get degraded.

Thus when the conventionally known flow control algorithm alone is applied, the information in the RM cell (the ER value in particular) may not be updated correctly due to an erroneous operation at the destination end-node or the switch, and an ability to recover from the congestion may be lowered due to an erroneous operation at the source end-node.

SUMMARY OF THE INVENTION

It is therefore an object of the present invention to provide a method and a system for controlling the cell transmission rate in the ATM network, capable of preventing an incorrect updating of the information in the RM cell due to an erroneous operation at the destination end-node or the switch.

It is another object of the present invention to provide a method and a system for controlling the cell transmission rate in the ATM network, capable of enabling the ATM network to recover from the congestion without degrading the quality of service of the other connections even in a case of an erroneous operation at the source end-node.

According to one aspect of the present invention there is provided a method for controlling a cell transmission rate in an ATM network having first and second end-nodes for carrying out transmission and reception of cells, a switch for transferring cells, a first virtual connection for transferring cells from the first end-node to the second end-node via the switch, and a second virtual connection for transferring cells from the second terminal to the first terminal via the switch, the method comprising the steps of: (a) transmitting a resource management cell having an explicit cell rate field for entering a desired cell transmission rate value of the switch or the second end-node, from the first end-node to the second end-node through the first virtual connection; (b) returning the resource management cell from the second end-node to the first end-node through the second virtual connection; (c) storing a first cell transmission rate value written in the explicit cell rate field of the resource management cell transmitted by the step (a); (d) detecting a second cell transmission rate value written in the explicit cell rate field of the resource management cell returned by the step (b); and (e) rewriting the second cell transmission rate value detected by the step (d) into the first cell transmission rate value stored by the step (c) in the explicit cell rate field of the resource management cell returned by the step (b), when the second cell transmission rate value is larger than the first cell transmission rate value.

According to another aspect of the present invention there is provided an ATM network system, comprising: first and second end-nodes for carrying out transmission and reception of cells; a switch for transferring cells; a first virtual connection for transferring cells from the first end-node to the second end-node via the switch and a second virtual connection for transferring cells from the second terminal to the first terminal via the switch, wherein a resource management cell having an explicit cell rate field for entering a desired cell transmission rate value of the switch or the second end-node is transmitted from the first end-node to the second end-node through the first virtual connection, and the resource management cell is returned from the second end-node to the first end-node through the second virtual connection; and a control unit for storing a first cell transmission rate value written in the explicit cell rate field of the resource management cell transmitted by the first end-node, detecting a second cell transmission rate value written in the explicit cell rate field of the resource management cell returned by the second end-node, and rewriting the detected second cell transmission rate value into the stored first cell transmission rate value in the explicit cell rate field of the resource management cell returned by the second end-node, when the second cell transmission rate value is larger than the first cell transmission rate value.

According to another aspect of the present invention there is provided a system for controlling a cell transmission rate in an ATM network having first and second end-nodes for carrying out transmission and reception of cells, a switch for transferring cells, a first virtual connection for transferring cells from the first end-node to the second end-node via the switch, and a second virtual connection for transferring cells from the second to the first terminal via the switch, wherein a resource management cell having an explicit cell rate field for entering a desired cell transmission rate value of the switch or the second end-node is transmitted from the first end-node to the second end-node through the first virtual connection, and the resource management cell is returned from the second end-node to the first end-node through the second virtual connection, the system being provided between the first and second end-nodes and comprising: first means for storing a first cell transmission rate value written in the explicit cell rate field of the resource management cell transmitted by the first end-node; second means for detecting a second cell transmission rate value written in the explicit cell rate field of the resource management cell returned by the second end-node; and third means for rewriting the second cell transmission rate value detected by the second means into the first cell transmission rate value stored by the first means in the explicit cell rate field of the resource management cell returned by the second end-node, when the second cell transmission rate value is larger than the first cell transmission rate value.

Other features and advantages of the present invention will become apparent from the following description taken in conjunction with the accompanying drawings.

BRIEF DESCRIPTION OF THE DRAWINGS

FIG. 3 is a block diagram of an exemplary configuration for one embodiment of a cell transmission rate regulation unit according to the present invention.

FIG. 4 is a schematic block diagram of an exemplary configuration for an ATM network system incorporating the cell transmission rate regulation unit of FIG. 3.

DETAILED DESCRIPTION OF THE PREFERRED EMBODIMENTS

Referring now to FIG. 3 to FIG. 12, one embodiment of a method and a system for controlling the cell transmission rate in the ATM network according to the present invention will be described in detail.

Figure 1:
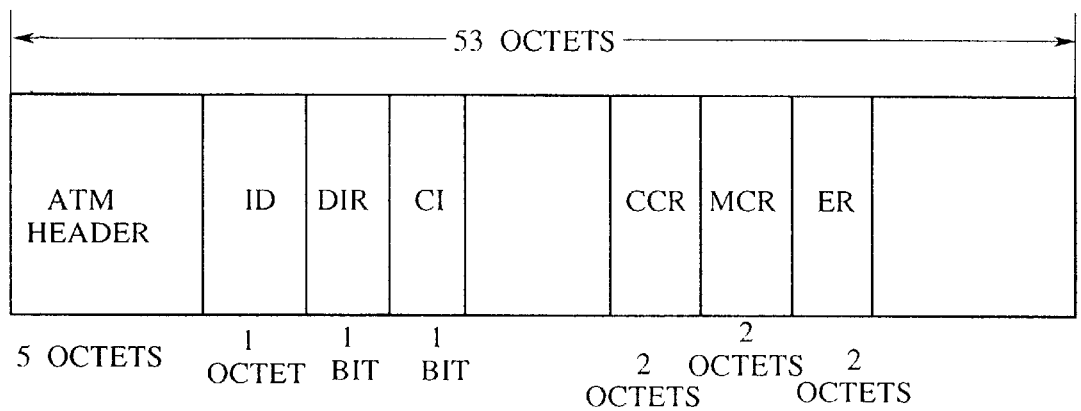
FIG. 1 is a diagram showing an exemplary format of a resource management cell.

FIG. 3 shows an exemplary configuration of a cell transmission rate regulation unit using a cell transmission rate regulation method of the present invention, and FIG. 4 shows an exemplary configuration of a communication system incorporating the cell transmission rate regulation unit of FIG. 3. In this embodiment, the RM cell with a format as shown in FIG. 1 described above will be used.

The cell transmission rate regulation unit of FIG. 3 comprises: RM cell detection units 11 and 12 provided on virtual connections 15a and 15b, respectively; a parameter calculation unit 13 connected with the RM cell detection units 11 and 12 and having a monitoring parameter calculation unit 131 and an ER value inspection unit 132; and a violation cell policing unit 14 provided on the virtual cell 15a and connected with the monitoring parameter calculation unit 131 of the parameter calculation unit 13.

Here, the virtual connection 15a is a connection on which the cell transmission rate is to be monitored, while the virtual connection 15b is a connection used in returning the RM cell from the destination end-node to the source end-node.

Each of the RM cell detection units 11 and 12 recognizes whether an arrived cell is an RM cell or a usual data cell, reads information in the arrived cell that is recognized as the RM cell, and updates the information in the RM cell according to the need. The parameter calculation unit 13 modifies the monitoring parameter according to the information in the RM cell read out by the RM cell detection unit 11 or 12, carries out the inspection of the ER value, and notifies modified values of the information in the RM cell to the RM cell detection unit 11 or 12 when the modification of the values of the information in the RM cell is necessary as a result of the inspection. The violation cell policing unit 14 judges whether the arrived cell is in violation of the monitoring parameter calculated by the parameter calculation unit 13, and applies the policing control to discard the violation cell when the arrived cell is judged as the violation cell.

In the parameter calculation unit 13, the monitoring parameter calculation unit 131 updates the monitoring parameter, and rewrites the CCR value or the ER value in the RM cell according to the monitoring parameter, while the ER value inspection unit 132 inspects the ER value in the RM cell and rewrites the ER value when the inspected ER value is not an appropriate ER value.

In this cell transmission rate regulation unit of FIG. 3, both the virtual connection 15a for transferring the cell flow to be monitored and the virtual connection 15b for transferring the RM cell which is returned to the source end-node of the cell flow transferred through the virtual connection 15a are to be recognized, and the operation by the violation cell policing unit 14 is selectively applied according to a request from the destination end-node.

Figure 2:
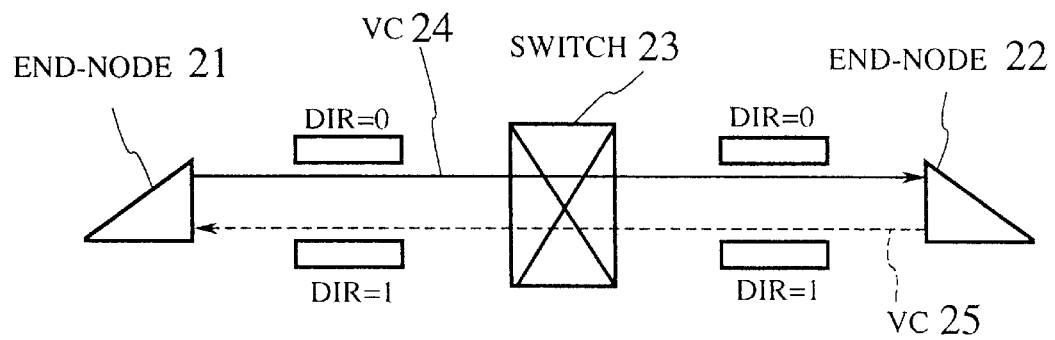
FIG. 2 is a schematic block diagram of a conventional ATM network system.

The communication system of FIG. 4 comprises: end-nodes 21 and 22 formed by terminals or switches for carrying out cell transmission and reception, a switch unit 23 connected between the end-nodes 21 and 22, the cell transmission rate regulation unit 26 similar to that of FIG. 3 which is connected between the end-node 21 and the switch 23, the cell transmission rate regulation unit 27 similar to that of FIG. 3 which is connected between the end-node 22 and the switch 23, and virtual connections 24 and 25 connecting between the end-nodes 21 and 22. Here, the end-nodes 21 and 22, the switch unit 23, and the virtual connections 24 and 25 are substantially similar to those shown in FIG. 2 described above.

In this communication system of FIG. 4, the cell transmission rate regulation unit 26 is provided to apply the transmission rate regulation for the cell flow transferred on the virtual connection 24, while the cell transmission rate regulation unit 27 is provided to apply the transmission rate regulation for the cell flow transferred on the virtual connection 25. In other other words, the cell transmission rate regulation unit 26 deals with the virtual connection 24 as the virtual connection 15a of FIG. 3 and the virtual connection 25 as the virtual connection 15b of FIG. 3, while the cell transmission rate regulation unit 27 deals with the virtual connection 25 as the virtual connection 15a of FIG. 3 and the virtual connection 24 as the virtual connection 15b of FIG. 3.

Figure 5:
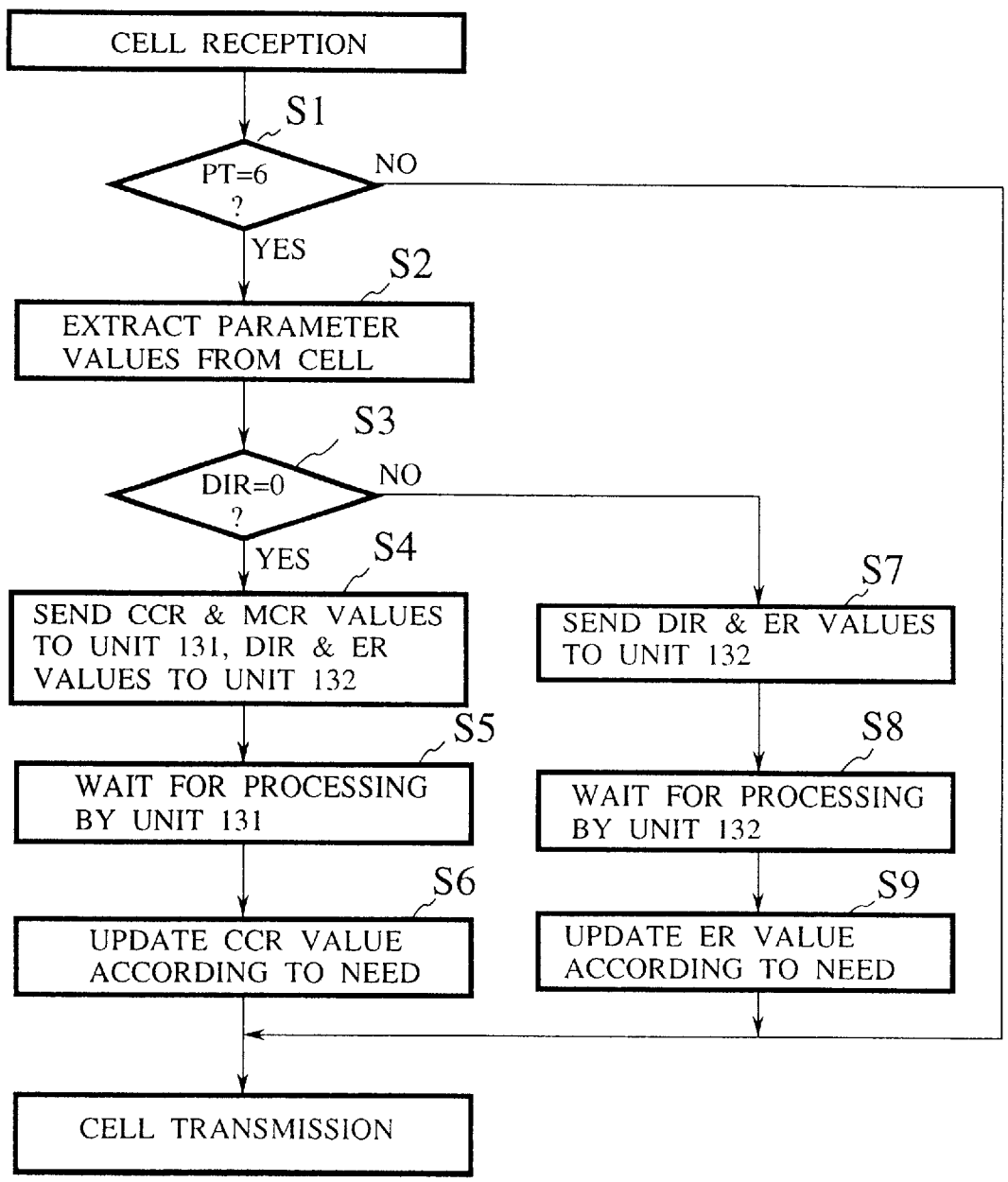
FIG. 5 is a flow chart for the operation of one RM cell detection unit in the cell transmission rate regulation unit of FIG. 3.

FIG. 5 shows a flow chart for the operation algorithm of the RM cell detection unit 11, which proceeds as follows.

Namely, when the cell is received through the virtual connection 15a, the PT value in the ATM header of the cell arrived from the virtual connection 15a is checked (step S1). When the PT value is 8, this arrived cell is recognized as the RM cell, and the parameter values in the payload are extracted from this RM cell (step S2). Then, the DIR value of the arrived RM cell is checked (step S3).

When the DIR value is 0, in order to operate the monitoring parameter calculation unit 131 and the ER value inspection unit 132, the CCR and MCR values are sent to the monitoring parameter calculation unit 131 while the DIR and ER values are sent to the ER value inspection unit 132 (step S4). Then, after the completion of the processing by the monitoring parameter calculation unit 131 as described below is waited (step S5), the CCR value in the RM cell is updated according to the need (step S6), and then the RM cell is transmitted further through the virtual connection 15a.

On the other hand, when the DIR value is 1, in order to operate the ER value inspection unit 132, the DIR and ER values are sent to the ER value inspection unit 132 (step S7). Then, after the completion of the processing by the ER value inspection unit 132 as described below is waited (step S8), the ER value in the RM cell is updated to a value given from the ER value inspection unit 132 according to the need (step S9), and then the RM cell is transmitted further through the virtual connection 15a.

When the cell arrived from the virtual connection 15a is not the RM cell, i.e., when the PT value is not 6 at the step S1, or when the arrived cell is not the RM cell to be detected by the RM cell detection unit 11, the arrived cell is immediately transmitted further through the virtual connection 15a.

Figure 6:
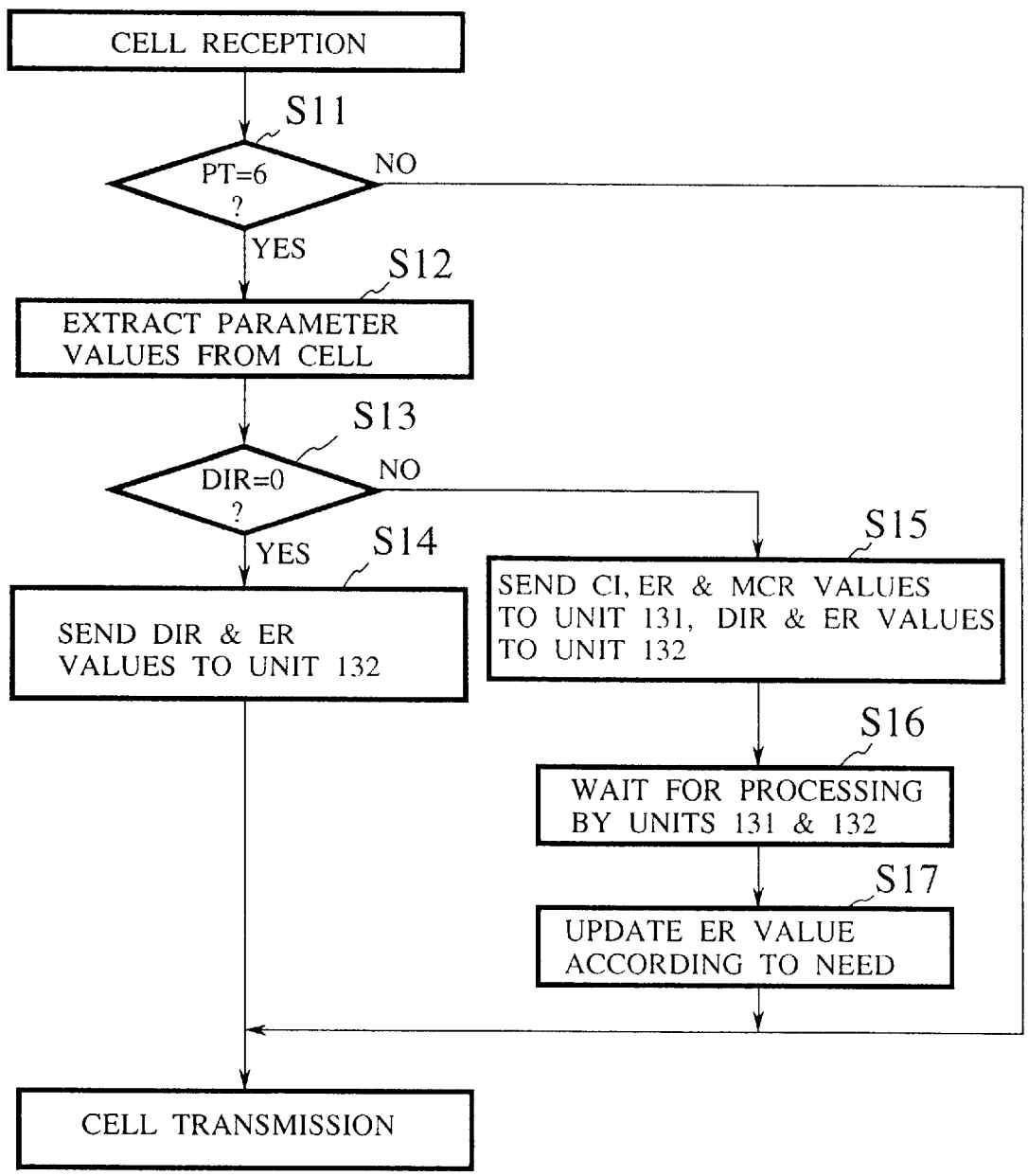
FIG. 6 is a flow chart for the operation of another RM cell detection unit in the cell transmission rate regulation unit of FIG. 3.

FIG. 6 shows a flow chart for the operation algorithm of the RM cell detection unit 12, which proceeds as follows.

Namely, when the cell is received through the virtual connection 15b, the PT value in the ATM header of the cell arrived from the virtual connection 15b is checked (step S11). When the PT value is 6, this arrived cell is recognized as the RM cell, and the parameter values in the payload are extracted from this RM cell (step S12). Then, the DIR value of the arrived RM cell is checked (step S13).

When the DIR value is 0, in order to operate the ER value inspection unit 132, the DIR and ER values are sent to the ER value inspection unit 132 (step S14), and then the RM cell is transmitted further through the virtual connection 15b.

On the other hand, when the DIR value is 1, in order to operate the monitoring parameter calculation unit 131 and the ER value inspection unit 132, the CI, ER, and MCR values are sent to the monitoring parameter calculation unit 131 while the DIR and ER values are sent to the ER value inspection unit 132 (step S15). Then, after the completion of the processing by the monitoring parameter calculation unit 131 and the ER value inspection unit 132 as described below is waited (step S16), the ER value in the RM cell is updated to a value given from the ER value inspection unit 132 according to the need (step S17), and then the RM cell is transmitted further through the virtual connection 15b.

Note here that the ER value in the RM cell used at the monitoring parameter calculation unit 131 should preferably be the ER value that has already been updated according to the need after the processing by the ER value inspection unit 132. In other words, the monitoring parameter calculation unit 131 should preferably be operated after the processing by the ER value inspection unit 132 is completed.

When the cell arrived from the virtual connection 15b is not the RM cell, i.e., when the PT value is not 6 at the step S11, or when the arrived cell is not the RM cell to be detected by the RM cell detection unit 12, the arrived cell is immediately transmitted further through the virtual connection 15b.

Figure 7A:
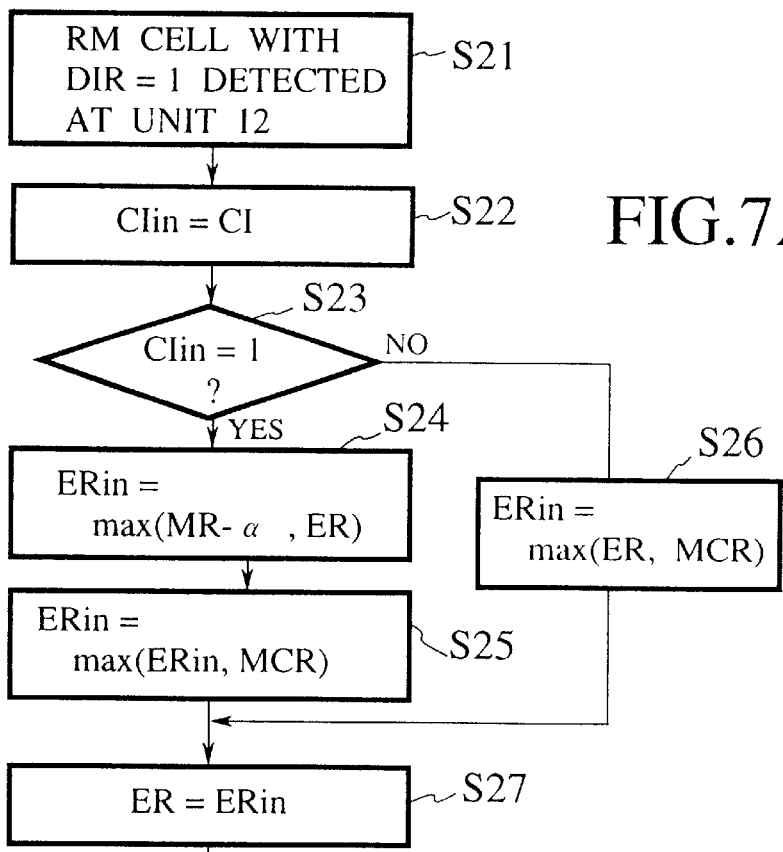
FIGS. 7A and 7B are flow charts for the operation of a monitoring parameter calculation unit in the cell transmission rate regulation unit of FIG. 3.
Figure 7B:
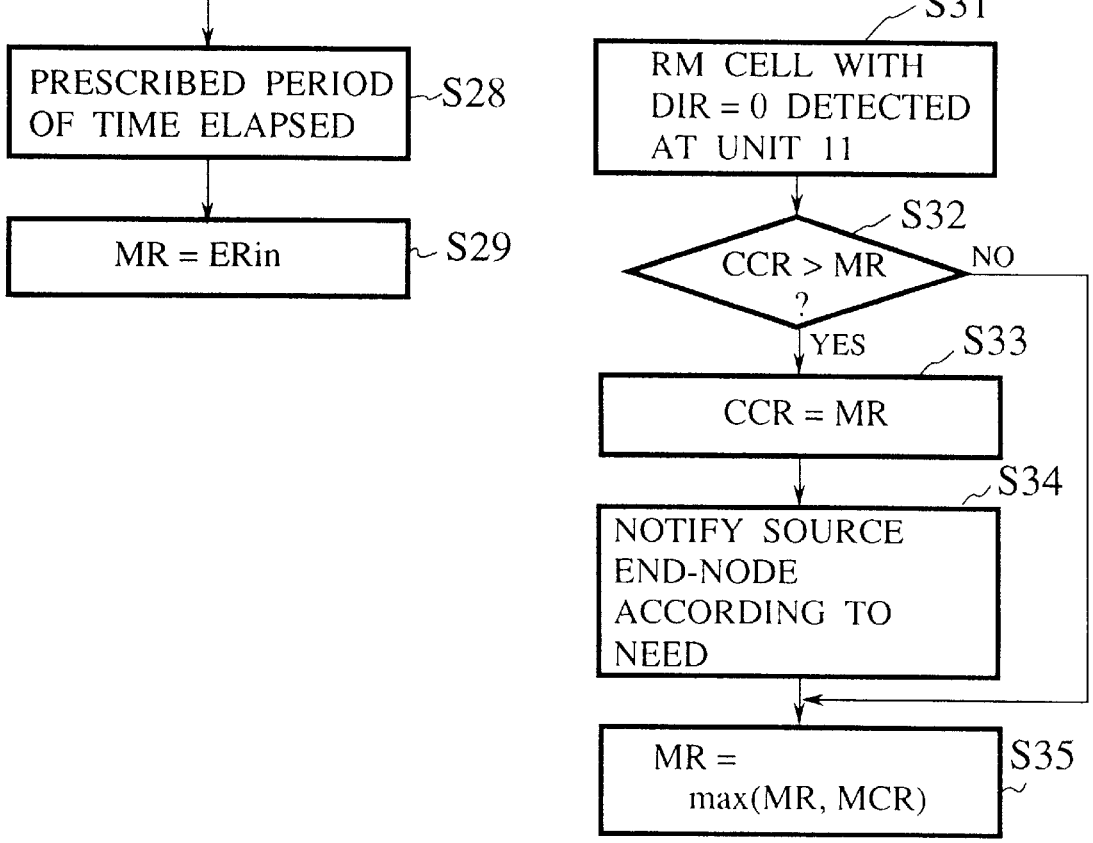

FIGS. 7A and 7B show flow charts for the operation procedure of the monitoring parameter calculation unit 131 for calculating the monitoring parameter value MR, where FIG. 7A is for the operation with respect to the RM cell detected by the RM cell detection unit 12, while FIG. 7B is for the operation with respect to the RM cell detected by the RN cell detection unit 11.

First, the operation with respect to the RM cell detected by the RM cell detection unit 12 according to the flow chart of FIG. 7A proceeds as follows.

Namely, when the RM cell with the DIR value 1 is detected at the RM cell detection unit 12 (step S21), in order to recognize a presence or absence of the congestion at a switch in the ATM network, the CI value in the arrived RM cell is substituted into a congestion indication parameter CIin used in the monitoring parameter (step S22).

Also, because the DIR value of the RM cell detected by the RM cell detection units 12 is 1, it can be recognized that this is the RM cell returned from the destination end-node to the source end-node. Thus, when CIin=1 (step S23 Yes), it implies that the congestion has occurred between this cell transmission rate regulation unit and the destination end-node, so that the monitoring parameter value MR is updated to a value lower than the current value in order to prevent an increase of an amount of cells flowing into the congested portion.

To this end, the smaller one of (MR-$\alpha$) and ER value is substituted into an explicit cell rate parameter ERin used in the monitoring parameter calculation unit 131 (step S24), and then the larger one of the explicit cell rate parameter ERin obtained at the step S24 and the MCR value is substituted into the explicit cell rate parameter ERin (step S25) because the source end-node is permitted to make the cell transmission at the minimum cell transmission rate MCR. Also, when CIin=0 (step S23 No), the larger one of the ER value and the MCR value is substituted into the explicit cell rate parameter ERin (step S26) because the source end-node is permitted to make the cell transmission at the minimum cell transmission rate MCR. In this manner, the explicit cell rate parameter ERin is updated at the monitoring parameter calculation unit 131.

Here, at the steps S24 and S26, the ER value used in updating the explicit cell rate parameter ERin is the ER value read out from the arrived RM cell when the ER value inspection unit 132 does not update the ER value in this RM cell, or the ER value saved in the ER value inspection unit 132 when the ER value inspection unit 132 updates the ER value in this RM cell.

At the step S24 described above, $\alpha$ is a decrement to be used in a case of providing a function to reduce the monitoring parameter autonomously at the cell transmission rate regulation unit. A case of not providing a function to reduce the monitoring parameter autonomously at the cell transmission rate regulation unit corresponds to a setting of $\alpha=0$. In order to obtain (MR-$\alpha$) at the step S24, one of the following schemes can be used.

Figure 8:
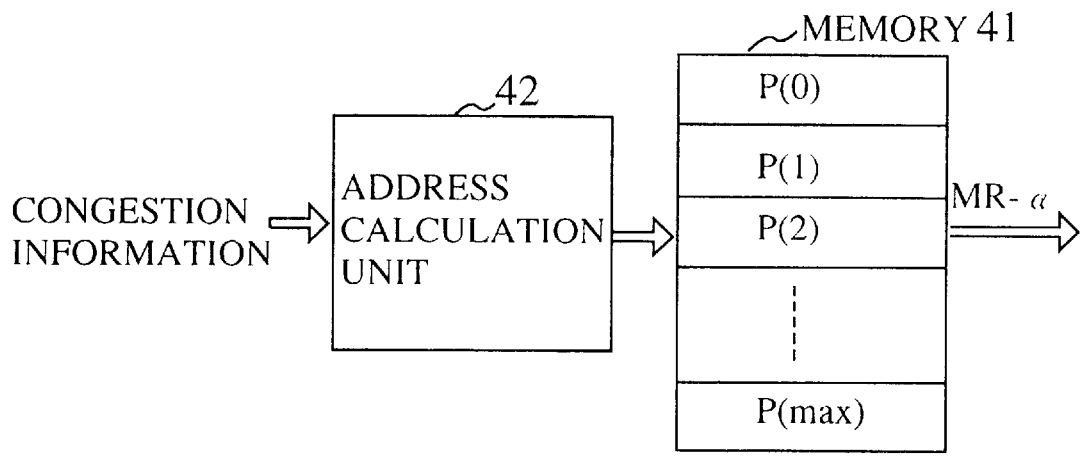
FIG. 8 is a schematic block diagram of one exemplary configuration for updating a monitoring parameter value in the cell transmission rate regulation unit of FIG. 3.

(1) As shown in FIG. 8, all monitoring parameter values (P(0) to P(max)) that can be monitored at the cell transmission rate regulation unit are registered in a memory 41 (in an order of their magnitudes) at distinct addresses in the memory 41, and in a case of modifying the monitoring parameter value, a look up address of the memory 41 indicated by an address calculation unit 42 is changed according to the congestion information, and the rate registered at a new look up address is set as a new monitoring parameter value (MR-$\alpha$).

(2) A monitoring parameter value calculation unit (not shown) for calculating a monitoring parameter value is provided, and a new monitoring parameter value (MR-$\alpha$) is calculated in this monitoring parameter value calculation unit by subtracting a predetermined constant $\alpha$ from the current monitoring parameter value MR every time it is judged that the congestion has occurred.

Figure 9:
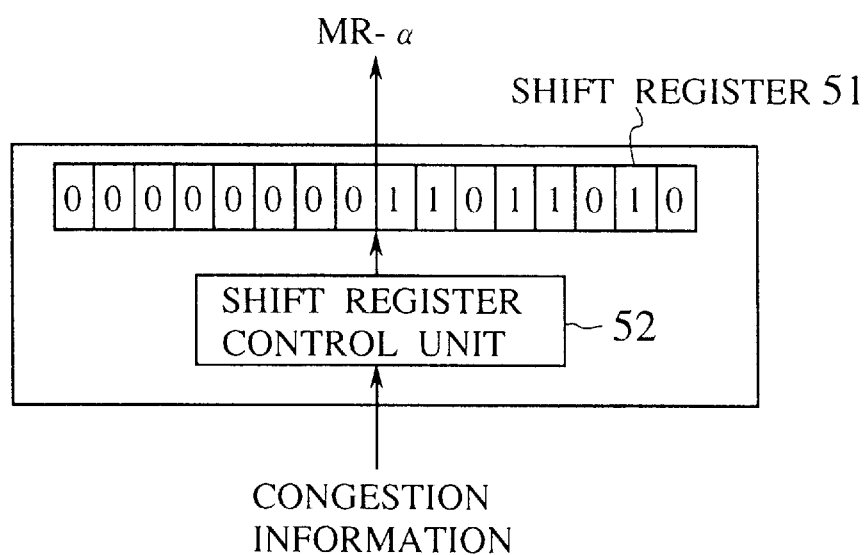
FIG. 9 is a schematic block diagram of another exemplary configuration for updating a monitoring parameter value in the cell transmission rate regulation unit of FIG. 3.

(3) As shown in FIG. 9, a shift register 51 is provided, and a value indicated by the shift register 51 is shifted by a shift register control unit 52 according to the congestion information to obtain a new monitoring parameter value (MR-α).

A value of the explicit cell rate parameter ERin obtained by the step S24 or S25 is then written into the Er field of the RM cell with DIR=1 currently detected by the RM cell detection unit 12 as an updated ER value, and then this RM cell is transmitted to the source end-node (step S27). At the same time, a timer for counting a prescribed period of time is activated within the monitoring parameter calculation unit 131, and after the prescribed period of time has elapsed (step S28), a value of the explicit cell rate parameter ERin is substituted into the monitoring parameter value MR as a new monitoring parameter to be used subsequently (step S29).

Here, it is preferable to set this prescribed period of time to be longer than or equal to a time required for the RM cell transmitted from this cell transmission rate regulation unit to reach to the source end-node, the source end-node to modify its cell transmission rate according to the that RM cell, and cells transmitted from the source end-node at a modified cell transmission rate to reach to this cell transmission rate regulation unit.

In other words, it is preferable to use the following setting: a wait time until the monitoring parameter modification≧2×(a propagation delay between the source end-node and the cell transmission rate regulation unit)+(a processing time required for modifying the cell transmission rate in the source end-node).

Next, the operation with respect to the RM cell detected by the RM cell detection unit 11 according to the flow chart of FIG. 7B proceeds as follows.

Namely, when the RM cell with the DIR value 0 is detected at the RM cell detection unit 11 (step S31), because the DIR value of the RM cell detected by the RM cell detection unit 11 is 0, it can be recognized that this is the RM cell transmitted from the source end-node to the destination end-node. Thus, the CCR value in this RM cell and the current monitoring parameter value MR are compared to see if CCR>MR or not (step S32).

At this point, if CCR>MR, it implies that the source end-node is making the cell transmission at the cell transmission rate which is exceeding the ER value notified by the RM cell, so that the current monitoring parameter value MR is substituted into the CCR value of the RM cell (step S33), and the violation of the cell transmission rate is notified to the source end-node according to the need (step S34).

When CCR≦MR at the step S32 or after the step S34 is completed, the larger one of the current monitoring parameter value MR and the MCR value is substituted into the current monitoring parameter value MR (step S35) because the source end-node is permitted to make the cell transmission at the minimum cell transmission rate MCR.

The monitoring parameter value MR obtained by the monitoring parameter calculation unit 131 in the manner described above is then sent to the violation cell policing unit 14. The violation cell policing unit 14 has a prescribed cell transmission rate monitoring procedure installed therein in advance, and determines whether a cell arriving at this violation cell policing unit 14 is a violation cell or not by setting the current monitoring parameter value MR into this procedure. Here, the known procedure that can be used as the prescribed cell transmission rate monitoring procedure to be installed in the violation cell policing unit 14 includes the GCRA (General Cell Rate Algorithm) for example (see, ATM UNI Specification version 3.1 for detail).

Figure 10:
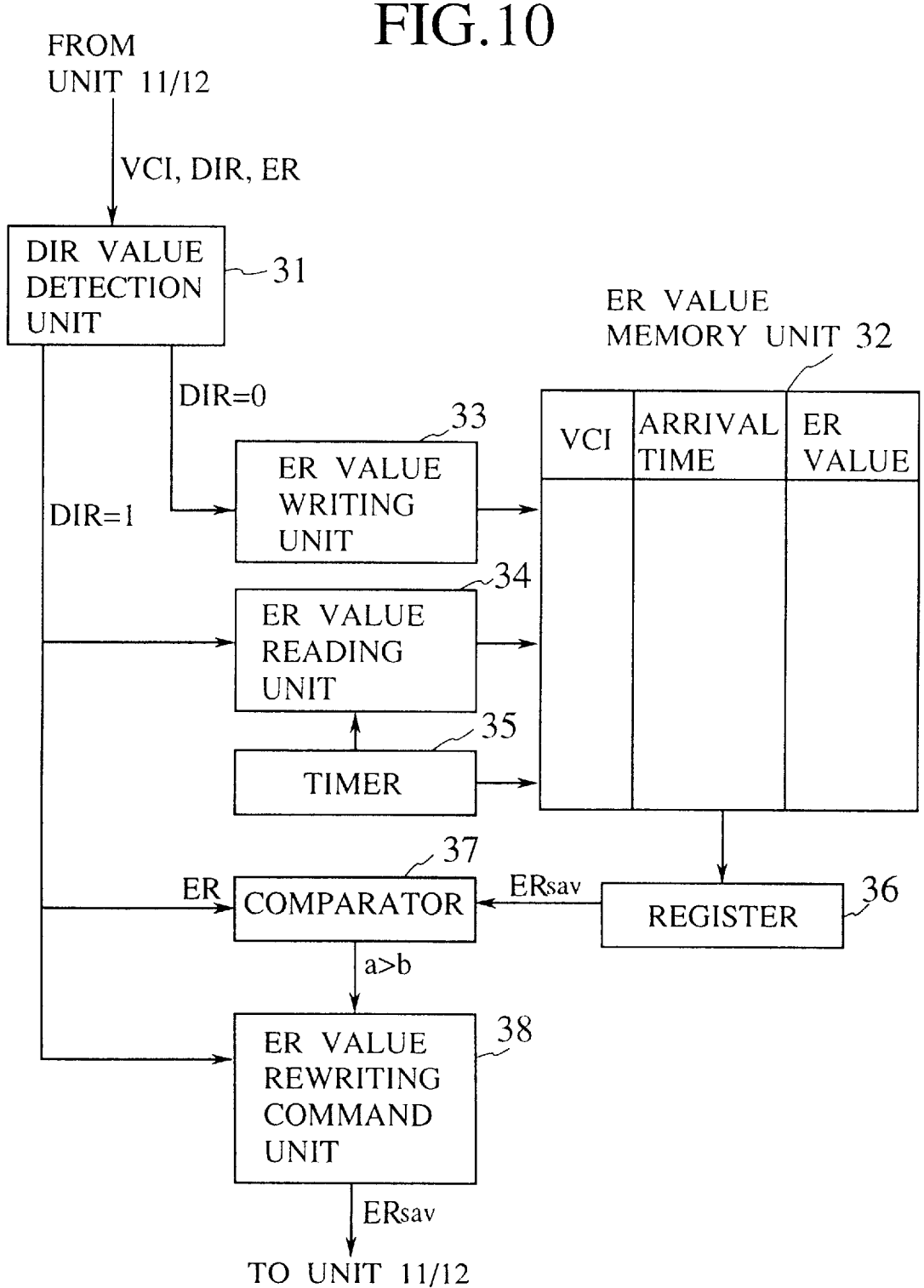
FIG. 10 is a block diagram of an exemplary configuration for an ER value inspection unit in the cell transmission rate regulation unit of FIG. 3.

FIG. 10 shows an exemplary configuration of the ER value inspection unit 132, which comprises: a DIR value detection unit 31; an ER value writing unit 33 connected with the DIR value detection unit 31; an ER value reading unit 34 connected with the DIR value detection unit 31; a timer 35 connected with the ER value reading unit 34; an ER value memory unit 32 connected with the ER value writing unit 33, the ER value reading unit 34, and the timer 35; a register 36 connected with the ER value memory unit 32; a comparator connected with the DIR value detection unit 31 and the register 36; and an ER value rewriting command unit 38 connected with the DIR value detection unit 31 and the comparator 37.

In this ER value inspection unit of FIG. 10, the DIR value detection unit 31 receives the VCI, DIR and ER values of the RM cell detected at the RM cell detection unit 11 or 12 and recognizes the detected RM cell as the RM cell with DIR=0 or the RM cell with DIR=1. The ER value memory unit 32 stores the VCI value of the connection to which the detected RM cell with DIR=0 belongs the arrival time of that RM cell, and the ER value of that RM cell, in correspondence. The ER value writing unit 33 writes these VCI value, arrival time, and ER value of the detected RM cell with DIR=0 into the ER value memory unit 32. The ER value reading unit 34 searches out and reads out the earlier ER value possessed by the detected RM cell with DIR=1 when it arrived at this cell transmission rate regulation unit as the RM cell with DIR=0 in past. The timer 35 counts the time within this ER value inspection unit.

The register 36 holds the ER value (ERsav) searched out by the ER value reading unit 34. The comparator 37 compares the ER value of the detected RM cell with DIR=1 and the ER value (the ERsav value) held in the register 36 to see if ER>ERsav or not. The ER value rewriting command unit 38 commands the rewriting of the ER value by the ERsav value to the RM cell detection unit 11 or 12 only when it is judged that ER>ERsav at the comparator 37.

Figure 11:
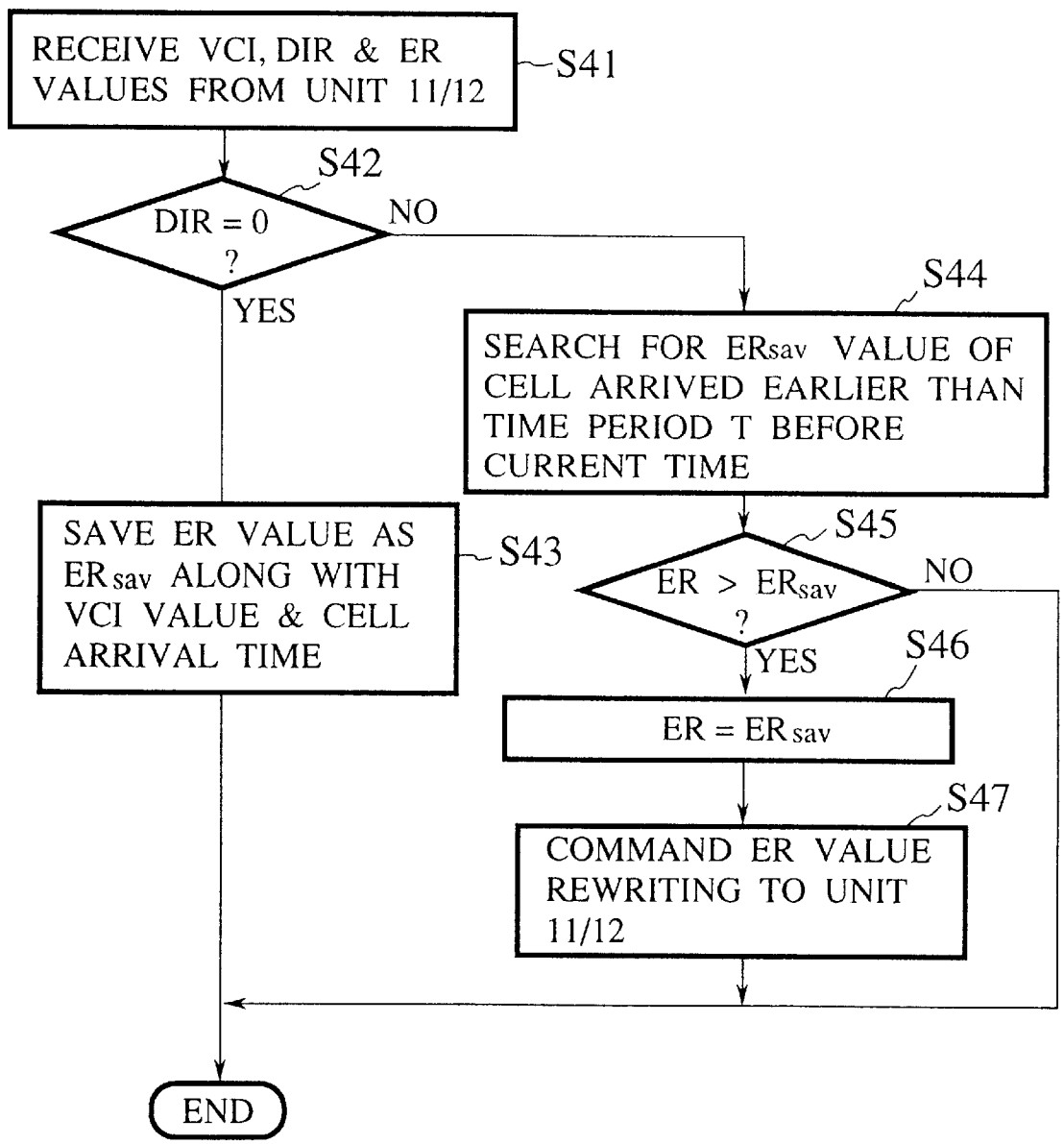
FIG. 11 is a flow chart for the operation of the ER value inspection unit of FIG. 10.

FIG. 11 shows a flow chart for the operation of this ER value inspection unit 132 of FIG. 10, which proceeds as follows.

When the RM cell is detected at the RM cell detection unit 11 or 12, the VCI, DIR and ER values of the detected RM cell are received from the RM cell detection unit 11 or 12 (step S41), and the DIR value is recognized at the DIR value detection unit 31 (step S42).

When it is judged by the DIR value detection unit 31 that the detected RM cell has DIR=0, the ER value writing unit 33 writes the VCI value of that RM cell, the current time counted by the timer 35, and the ER value of that cell into a vacant entry in the ER value memory unit 32 (step S43). Hereafter, the ER value stored in the ER value memory unit 32 will be referred to as ERsav.

On the other hand, when it is judged by the DIR value detection 31 that the detected RM cell has DIR=1, the earlier ER value (ERsav) possessed by that detected RM cell when it arrived at this cell transmission rate regulation unit as the RM cell with DIR=0 in past is searched out and read out from the ER value memory unit 32 by the ER value reading unit 34 (step S44).

At this point, the ER value reading unit 34 is provided in advance with a known time period T required for the RM cell with DIR=0 to be transmitted from this cell transmission rate regulation unit, returned at the destination end-node, and received again at this cell transmission rate regulation unit as the RM cell with DIR=1. Consequently, the information in the ER value memory unit 32 which has the arrival time earlier than the time period T before the current time (notified by the timer 35) at which this RM cell with DIR=1 arrived can be recognized by the ER value reading unit 34 as the information possessed by that detected RM cell when it arrived at this cell transmission rate regulation unit as the RM cell with DIR=0 in past.

Also, at this point, the candidates for the ER value to be read out can be narrowed down by providing a correspondence table for the VCI value in the ER value reading unit 34. For example, this correspondence table can indicate an information that the RM cell with DIR=1 transferring on the virtual connection 25 is the returned RM cell of the RM cell with DIR=0 transferred on the virtual connection 24.

Also, the above described time period T can be appropriately updated at the ER value reading unit 34 by utilizing a difference between the time at which the RM cell with DIR=0 arrived at this cell transmission rate regulation unit (the arrival time information in the ER value memory unit 32) and the time at which the RM cell with DIR=1 arrived at this cell transmission rate regulation unit (a value of the timer 35).

The ERsav value read out by the ER value reading unit 34 is then registered into the register 36. At this point, the information related to the read out ER value is deleted from the ER value memory unit 32.

Then, at the comparator 37, the ER value of the detected RM cell with DIR=1 and the ER value (the ERsav value) held in the register 36 (step S45), and when ER>ERsav, the ER value for that RM cell is set to the ERsav value (step S46) and the ER value rewriting command unit 38 commands the rewriting of the ER value by the ERsav value to the RM cell detection unit 11 or 12 which detected this RM cell with DIR=1 (step S47).

By means of this operation by the ER value inspection unit 132, it becomes possible to recover the ER value of the RM cell from an incorrect value resulting from an erroneous operation to increase the ER value in the RM cell at the switch or the destination end-node.

Figure 12:
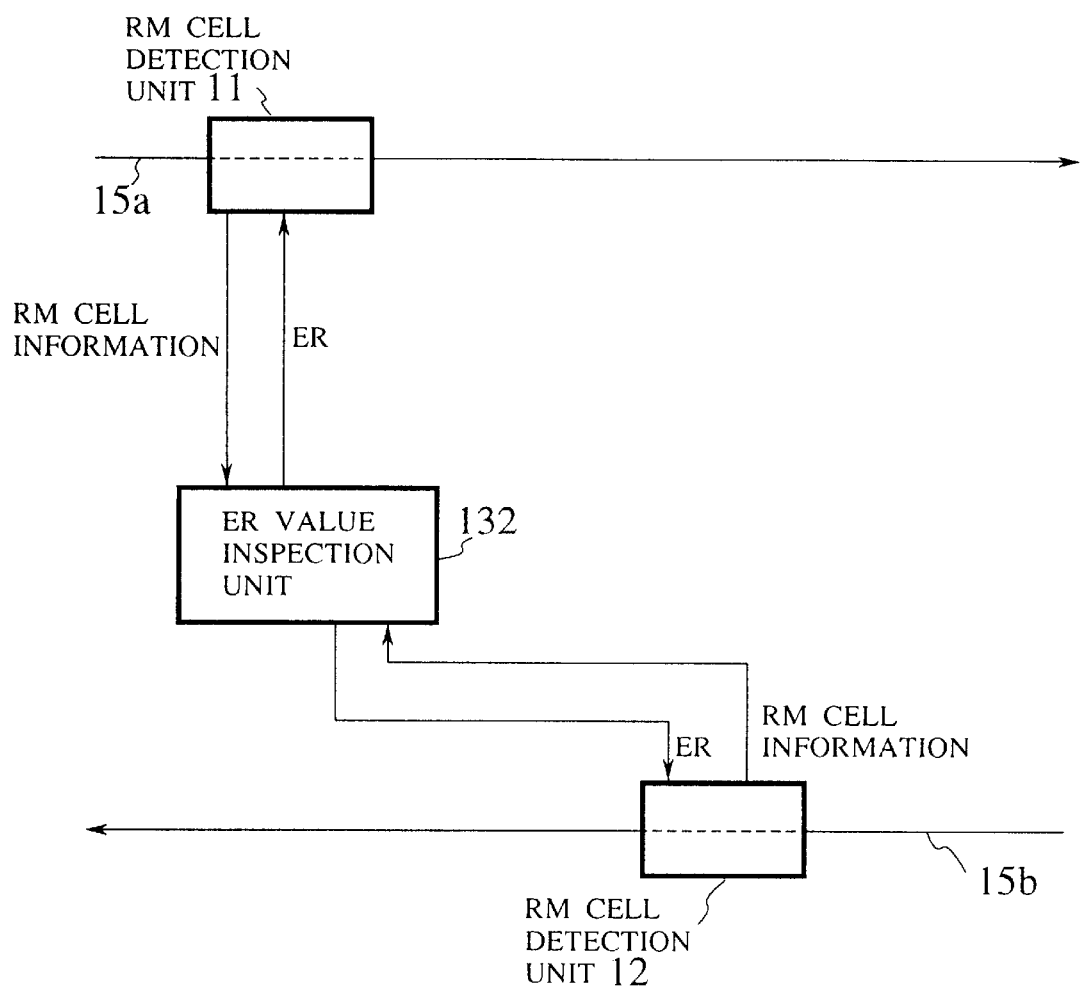
FIG. 12 is a block diagram of one possible modified configuration for a cell transmission rate regulation unit according to the present invention.

It is to be noted that it is also possible to provide the ER value inspection unit 132 as describe above independently in conjunction with the RM cell detection units 11 and 12 as shown in FIG. 12, in a case of not installing the function to inspect the ER value (i.e., the ER value inspection unit 132) within the cell transmission rate regulation unit.

In the following, the major features of the present invention as described above will be summarized.

First, in the present invention, the fixed length data packets called cells are to be communicated, and there are first and second end-nodes for carrying out transmission and reception of cells which are formed by terminals or switches. Then, the first and second end-nodes are connected virtually, by setting up at least the first virtual connection to be used by cells transferred from the first end-node to the second end-node and the second virtual connection to be used by cells transferred from the second end-node to the first end-node.

The first end-node transmits cells to the second end-node, where cells include RM cells. Here, the RM cells are transmitted from the first end-node (source end-node) to the second end-node (destination end-node) using the first virtual connection at prescribed regular intervals, for the purpose of managing the network resource available to the first virtual connection transferring these RM cells. When the RM cells reach to the second end-node, the RM cells are returned from the second end-node to the first end-node using the second virtual connection and received by the first end-node.

Each RM cell has a DIR field for indicating a current transmission direction of this RM cell (a direction toward the destination end-node or a direction toward the source end-node), a CCR field for indicating a current cell transmission rate at the source end-node when this RM cell is transmitted from the source end-node, and an ER field for indicating a desired cell transmission rate of the switch or destination end-node which is entered for the purpose of notifying the source end-node by the switch or destination end-node through which the first or second virtual connection transferring this RM cell is passing.

Then, at the cell transmission rate regulation unit provided at an arbitrary position on the first virtual connection, the transmission rate of cells transmitted from the first end-node to the second end-node using the first virtual connection is monitored, and when the monitored transmission rate exceeds a prescribed threshold, the transfer of cells in the first virtual connection is regulated.

In this case, every time the RM cell with its transmission direction indicated as a direction toward the destination end-node which is transferred to the second end-node through the first virtual connection under the cell transmission rate regulation is received, a cell transmission rate value in the ER field of this RM cell is read out and stored.

Then, every time this cell transmission rate regulation unit receives that RM cell which is returned from the second end-node to the first end-node through the second virtual connection not under the cell transmission rate regulation, with its transmission direction rewritten as a direction toward the source end-node at the second end-node, the cell transmission rate value in the ER field of that RM cell is compared with the earlier stored cell transmission rate value of that RM cell, and when the cell transmission rate value in the ER field of the received RM cell is greater than the earlier stored cell transmission rate value, a value of the ER field in the received RM cell is updated to the earlier stored cell transmission rate value.

Also, at the cell transmission rate regulation unit provided at an arbitrary position on the second virtual connection, the transmission rate of cells transmitted from the second end-node to the first end-node using the second virtual connection is monitored, and when the monitored transmission rate exceeds a prescribed threshold, the transfer of cells in the second virtual connection is regulated.

In this case, every time the RM cell with its transmission direction indicated as a direction toward the destination end-node which is transferred to the second end-node through the first virtual connection not under the cell transmission rate regulation is received, a cell transmission rate value in the ER field of this RM cell is read out and stored.

Then, every time this cell transmission rate regulation unit receives that RM cell which is returned from the second end-node to the first end-node through the second virtual connection under the cell transmission rate regulation, with its transmission direction rewritten as a direction toward the source end-node at the second end-node, the cell transmission rate value in the ER field of the received RM cell is compared with the earlier stored cell transmission rate value of that RM cell, and when the cell transmission rate value in the ER field of the received RM cell is greater than the earlier stored cell transmission rate value, a value of the ER field in the received RM cell is updated to the earlier stored cell transmission rate value.

In these cases, the cell transmission rate regulation unit estimates in advance a time period required by the RM cell with its transmission direction indicated as a direction toward the destination end-node since it is transmitted from the cell transmission rate regulation unit until it is returned back to the cell transmission rate regulation unit after its transmission direction is rewritten as a direction toward the source end-node at the second end-node.

Then, when the RM cell with its transmission direction indicated as a direction toward the source end-node is received at the cell transmission rate regulation unit, the cell transmission rate value read out and stored from the RM cell with its transmission direction indicated as a direction toward the destination end-node which arrived earlier than the required time period estimated above before an arrival time of the received RM cell is selected as the earlier stored cell transmission rate value to be compared with the cell transmission rate value in the ER field of the received RM cell.

Next, another feature of the present invention is that the RM cell transmitted from the second end-node to the first end-node through the second virtual connection has a CI field for indicating the congestion indication information which is entered by the switch through which this second virtual connection is passing, for the purpose of notifying an occurrence of the congestion at the switch to the first end-node transmitting cells.

When this RM cell is received at the cell transmission rate regulation unit, the congestion indication information in the CI field of the RM cell is read out, and the RM cell is transmitted to the first end-node. Then, when the read out congestion indication information indicates a presence of the congestion, the cell transmission rate is regulated without increasing the threshold for the cell transmission rate above the current threshold, until another RM cell with the CI field having the congestion indication information indicating an absence of the congestion is received by the cell transmission rate regulation unit.

In this case, when the cell transmission rate regulation unit receives the RM cell with the CI field having the congestion indication information indicating a presence of the congestion which is transmitted from the second end-node to the first end-node through the second virtual connection, the cell transmission rate is regulated by autonomously modifying the threshold for the cell transmission rate to a threshold lower than the current threshold.

Also, in a case of autonomously modifying the threshold for the cell transmission rate to a lower threshold upon receiving the RM with the CI field having the congestion indication information indicating a presence of the congestion, a value based on the modified threshold such as the modified threshold value itself or its inverse is overwritten in the ER field of the RM cell transmitted to the first end-node, so as to notify the modified threshold for the cell transmission rate to the first end-node.

In addition, in a case of autonomously modifying the threshold for the cell transmission rate to a lower threshold upon receiving the RM with the CI field having the congestion indication information indicating a presence of the congestion, the cell transmission rate regulation unit estimates in advance a time period required for the RM cell with its ER field overwritten by the modified threshold to reach to the first end-node from the cell transmission rate regulation unit, and for a cell transmitted from the first end-node after an arrival of that RM cell at the first end-node to reach to the cell transmission rate regulation unit. Then, the regulation using the modified threshold is started after a delay of the required time period estimated above at least.

According to the present invention as summarized above, it becomes possible to monitor and modify the cell transmission rate in the ER field of the RM cell. This cell transmission rate in the ER field of the RM cell normally should not be rewritten into a value larger than the originally entered value at the switch or the destination end-node.

In the present invention, in order to detect the rewriting of this cell transmission rate in the ER field to a larger value by an erroneous operation at the switch or the destination end-node, the cell transmission rate in the ER field of the RM cell is stored every time the RM cell transmitted to the destination end-node passes through the cell transmission rate regulation unit, and compared with the cell transmission rate in the ER field of the RM cell returned from the destination end-node to the source end-node and received at the cell transmission rate regulation unit. Then, when the latter value is greater than the former value, the former value is overwritten into the ER field of the received RM cell. In this manner, it becomes possible to protect the cell transmission rate in the ER field of the RM cell which should reflect the congestion state in the network from an erroneous rewriting by the switch or the destination end-node.

Here, the cell transmission rate regulation unit also monitors the transmission rate of cells transferred through the virtual connection, and regulates the transfer of cells when the monitored transmission rate exceeds a prescribed threshold.

Note that the above described functions to store the cell transmission rate in the ER field of the RM cell transferred through the first virtual connection, compare the stored value with the cell transmission rate in the ER field of the RM cell transferred through the second virtual connection, and rewrite the cell transmission rate in the ER field of the received RM cell can be installed on the cell transmission rate regulation unit for monitoring the first virtual connection and/or the cell transmission rate regulation unit for monitoring the second virtual connection.

Moreover, these functions may be provided at a unit other than the cell transmission rate regulation unit such as an end-node or a switch, or as an independent unit not existed in the conventional communication system.

Also, by estimating in advance a time period required by the RM cell since it is transmitted from the cell transmission rate regulation unit until it is returned back from the destination end-node to the cell transmission rate regulation unit, it becomes possible to predict the time at which the RM cell transferred to the destination end-node and received earlier at the cell transmission rate regulation unit is going to arrive at the cell transmission rate regulation unit again by being returned at the destination end-node, so that it becomes possible to compare the cell transmission rate in the ER field of the received RM cell with a corresponding earlier stored cell transmission rate.

Also, in the present invention, the congestion indication information is read out from the RM cell transferred to the source end-node at the cell transmission rate regulation unit, and when this congestion indication information indicates a presence of the congestion, the monitoring parameter is not increased until another RM cell with the congestion indication information indicating an absence of the congestion is received, so that it is possible to prevent an increase of an amount of cells flowing into the switch that has fallen into the congestion state.

Moreover, by reducing the monitoring parameter autonomously at the cell transmission rate regulation unit, it also becomes possible to enable the network to achieve a fast recovery from the congestion. In this case, the cell transmission rate desired by the network side can be notified to the source end-node by entering the reduced monitoring parameter into the ER field for indicating the desired cell transmission rate of the switch or the destination end-node through which the virtual connection passes, so that it becomes possible for the source end-node to initiate the cell transmission control in accordance with the congestion state in the network.

Also, by estimating in advance a time period required for the RM cell to reach to the source end-node from the cell transmission rate regulation unit, and for a cell transmitted from the source end-node after an arrival of that RM cell at the source end-node to reach to the cell transmission rate regulation unit, it becomes possible to apply the regulation using the reduced monitoring parameter to the cells transmitted by the source end-node after the source end-node is notified about the reduction of the monitoring parameter.

As described, according to the present invention, even when the cell transmission rate in the RM cell to be entered by the switch or the destination end-node for the purpose of notifying the congestion state in the ATM communication network to the source end-node is rewritten incorrectly to a value which worsen the system performance due to an erroneous operation at some switch or the destination end-node, it is possible to detect this erroneous operation and correct the incorrect cell transmission rate value, so that the congestion state can be notified to the source end-node correctly.

In addition, by reading out the congestion indication information in the RM cell at the cell transmission rate regulation unit, and not increasing the monitoring parameter at the cell transmission rate regulation unit while the congestion indication information indicates a presence of the congestion, it becomes possible to suppress an amount of cells flowing into the network even when the cell transmission rate is erroneously increased by the source end-node during the congestion, so that the further deterioration of the congestion state in the network can be prevented.

It is to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A method for controlling a cell transmission rate in an ATM network having first and second end-nodes for carrying out transmission and reception of cells, a switch for transferring cells, a first virtual connection for transferring cells from the first end-node to the second end-node via the switch, and a second virtual connection for transferring cells from the second end-node to the first end-node via the switch, the method comprising the steps of:

(a) transmitting a resource management cell having an explicit cell rate field for entering a desired cell transmission rate value of the switch or the second end-node, from the first end-node to the second end-node through the first virtual connection;

(b) returning the resource management cell from the second end-node to the first end-node through the second virtual connection;

(c) storing a first cell transmission rate value written in the explicit cell rate field of the resource management cell transmitted by the step (a);

(d) detecting a second cell transmission rate value written in the explicit cell rate field of the resource management cell returned by the step (b); and (e) rewriting the second cell transmission rate value detected by the step (d) to be the first cell transmission rate value stored by the step (c) in the explicit cell rate field of the resource management cell returned by the step (b), when the second cell transmission rate value is larger than the first cell transmission rate value.

2. The method of claim 1, further comprising the steps of:

(f) monitoring a cell transmission rate of cells transferred from the first end-node to the second end-node through the first virtual connection; and (g) regulating transfer of cells in the first virtual connection when the cell transmission rate monitored by the step (f) exceeds a prescribed threshold.

3. The method of claim 2, wherein the step (a) transmits the resource management cell at regular intervals while cells are transferred from the first end-node to the second end-node, and the step (c) stores the first cell transmission rate value while the step (f) monitors the cell transmission rate of the cells in the first virtual connection.

4. The method of claim 2, wherein the prescribed threshold used by the step (g) is determined according to the first cell transmission rate value stored by the step (c) when the second cell transmission rate value is larger than the first cell transmission rate value at the step (e).

5. The method of claim 2, wherein the resource management cell transmitted at the step (a) also has a congestion indication field for entering a congestion indication information indicating a presence/absence of a congestion in the switch, the step (d) also detects the congestion indication information in the congestion indication field of the resource management cell returned by the step (b), and the step (g) regulates the transfer of cells without increasing a value of the prescribed threshold while the congestion indication information detected by the step (d) indicates a presence of the congestion in the switch, until another resource management cell with the congestion indication information indicating an absence of the congestion in the switch is detected at the step (d).

6. The method of claim 5, wherein the prescribed threshold used by the step (g) is determined according to the first cell transmission rate value stored by the step (c) when the second cell transmission rate value is larger than the first cell transmission rate value at the step (e).

7. The method of claim 5, wherein the step (g) regulates the transfer of cells by modifying a value of the prescribed threshold to a lower threshold value autonomously when the congestion indication information detected by the step (d) indicates a presence of the congestion in the switch.

8. The method of claim 7, further comprising the step of:

(h) overwriting a value based on the lower threshold value in the explicit cell rate field of the resource management cell returned by the step (b), when the congestion indication information detected by the step (d) indicates a presence of the congestion in the switch, regardless of whether the second cell transmission rate value is rewritten into the first cell transmission rate value by the step (e).

9. The method of claim 8, further comprising the step of:

(i) estimating a time period required since the resource management cell is transmitted from a regulation unit provided on the ATM network to the first end-node after a value based on the lower threshold value is overwritten at the step (h) until a cell transmitted by the first end-node after the resource management cell reached the first end-node arrives at the regulation unit;

wherein the step (g) starts regulating the transfer of cells using the lower threshold value at the regulation unit after the time period estimated at the step (i) elapsed since the resource management cell is transmitted from the regulation unit.

10. The method of claim 1, further comprising the steps of:

(j) monitoring a cell transmission rate of cells transferred from the second end-node to the first end-node through the second virtual connection; and (k) regulating transfer of cells in the second virtual connection when the cell transmission rate monitored by the step (j) exceeds a prescribed threshold.

11. The method of claim 10, wherein the step (a) transmits the resource management cell at regular intervals while cells are transmitted from the second end-node to the first end-node, and the step (d) detects the second cell transmission rate value while the step (j) monitors the cell transmission rate of the cells in the second virtual connection.

12. The method of claim 1, further comprising the steps of:

(l) estimating a time period required since the first cell transmission rate value is stored from the resource management cell transmitted in the first virtual connection at the step (c) until the second cell transmission rate value is detected from the resource management cell returned in the second virtual connection at the step (d); and (m) selecting the first cell transmission rate value stored by the step (c) earlier than the time period estimated by the step (l) before a time of detecting the second cell transmission rate value at the step (d), as the first cell transmission rate value used in judging whether the second cell transmission rate value is larger than the first cell transmission rate value at the step (e).

13. An ATM network system, comprising:

first and second end-nodes for carrying out transmission and reception of cells;

a switch for transferring cells;

a first virtual connection for transferring cells from the first end-node to the second end-node via the switch and a second virtual connection for transferring cells from the second end-node to the first end-node via the switch, wherein a resource management cell having an explicit cell rate field for entering a desired cell transmission rate value of the switch or the second end-node is transmitted from the first end-node to the second end-node through the first virtual connection, and the resource management cell is returned from the second end-node to the first end-node through the second virtual connection; and a control unit for storing a first cell transmission rate value written in the explicit cell rate field of the resource management cell transmitted by the first end-node, detecting a second cell transmission rate value written in the explicit cell rate field of the resource management cell returned by the second end-node, and rewriting the detected second cell transmission rate value to be the stored first cell transmission rate value in the explicit cell rate field of the resource management cell returned by the second end-node, when the second cell transmission rate value is larger than the first cell transmission rate value.

14. The system of claim 13, wherein the control unit also monitors a cell transmission rate of cells transferred from the first end-node to the second end-node through the first virtual connection, and regulates transfer of cells in the first virtual connection when the monitored cell transmission rate exceeds a prescribed threshold.

15. The system of claim 14, wherein the first end-node transmits the resource management cell at regular intervals while cells are transferred from the first end-node to the second end-node, and the control unit stores the first cell transmission rate value while monitoring the cell transmission rate of the cells in the first virtual connection.

16. The system of claim 14, wherein the prescribed threshold used by the control unit is determined according to the stored first cell transmission rate value, when the detected second cell transmission rate value is larger than the stored first cell transmission rate value.

17. The system of claim 14, wherein the resource management cell transmitted by the first end-node also has a congestion indication field for entering a congestion indication information indicating a presence/absence of a congestion in the switch, and the control unit also detects the congestion indication information in the congestion indication field of the resource management cell returned by the second end-node and regulates the transfer of cells without increasing a value of the prescribed threshold while the detected congestion indication information indicates a presence of the congestion in the switch, until another resource management cell with the congestion indication information indicating an absence of the congestion in the switch is detected.

18. The system of claim 17, wherein the prescribed threshold used by the control unit is determined according to the stored first cell transmission rate value, when the detected second cell transmission rate value is larger than the stored first cell transmission rate value.

19. The system of claim 17, wherein the control unit regulates the transfer of cells by modifying a value of the prescribed threshold to a lower threshold value autonomously when the detected congestion indication information indicates a presence of the congestion in the switch.

20. The system of claim 19, wherein the control unit also overwrites a value based on the lower threshold value in the explicit cell rate field of the resource management cell returned by the second end-node, when the detected congestion indication information indicates a presence of the congestion in the switch, regardless of whether the second cell transmission rate value is rewritten into the first cell transmission rate value.

21. The system of claim 20, wherein the control unit also estimates a time period required since the resource management cell is transmitted from the control unit in the first end-node after a value based on the lower threshold value is overwritten until a cell transmitted by the first end-node after the resource management cell reached the first end-node arrives at the control unit, and starts regulating the transfer of cells using the lower threshold value after the estimated time period elapsed since the resource management cell is transmitted from the control unit.

22. The system of claim 13, wherein the control unit also monitors a cell transmission rate of cells transferred from the second end-node to the first end-node through the second virtual connection, and regulates transfer of cells in the second virtual connection when the monitored cell transmission rate exceeds a prescribed threshold.

23. The system of claim 22, wherein the first end-node transmits the resource management cell at regular intervals while cells are transmitted from the second end-node to the first end-node, and the control unit also detects the second cell transfer rate value while monitoring the cell transmission rate of the cells in the second virtual connection.

24. The system of claim 13, wherein the control unit also estimates a time period required since the first cell transmission rate value is stored from the resource management cell transmitted in the first virtual connection until the second cell transmission rate value is detected from the resource management cell returned in the second virtual connection, and selects the first cell transmission rate value stored earlier than the estimated time period before a time of detecting the second cell transmission rate value, as the first cell transmission rate value used in judging whether the second cell transmission rate value is larger than the first cell transmission rate value.

25. A system for controlling a cell transmission rate in an ATM network having first and second end-nodes for carrying out transmission and reception of cells, a switch for transferring cells, a first virtual connection for transferring cells from the first end-node to the second end-node via the switch, and a second virtual connection for transferring cells from the second end-node to the first end-node via the switch, wherein a resource management cell having an explicit cell rate field for entering a desired cell transmission rate value of the switch or the second end-node is transmitted from the first end-node to the second end-node through the first virtual connection, and the resource management cell is returned from the second end-node to the first end-node through the second virtual connection, the system being provided between the first and second end-nodes and comprising:

a first unit that stores a first cell transmission rate value written in the explicit cell rate field of the resource management cell transmitted by the first end-node;

a second unit that detects a second cell transmission rate value written in the explicit cell rate field of the resource management cell returned by the second end-node; and a third unit that rewrites the second cell transmission rate value detected by the second unit to be the first cell transmission rate value stored by the first unit in the explicit cell rate field of the resource management cell returned by the second end-node, when the second cell transmission rate value is larger than the first cell transmission rate value.

26. The system of claim 25, further comprising:

fourth means for monitoring a cell transmission rate of cells transferred from the first end-node to the second end-node through the first virtual connection; and fifth means for regulating transfer of cells in the first virtual connection when the cell transmission rate monitored by the fourth means exceeds a prescribed threshold.

27. The system of claim 26, wherein the first end-node transmits the resource management cell at regular intervals while cells are transferred from the first end-node to the second end-node, and the first means stores the first cell transmission rate value while the fourth means monitors the cell transmission rate of the cells in the first virtual connection.

28. The system of claim 26, wherein the prescribed threshold used by the fifth means is determined according to the first cell transmission rate value stored by the first means, when the second cell transmission rate value detected by the second means is larger than the first cell transmission rate value stored by the first means.

29. The system of claim 26, wherein the resource management cell transmitted by the first end-node also has a congestion indication field for entering a congestion indication information indicating a presence/absence of a congestion in the switch, the second means also detects the congestion indication information in the congestion indication field of the resource management cell returned by the second end-node, and the fifth means regulates the transfer of cells without increasing a value of the prescribed threshold while the congestion indication information detected by the second means indicates a presence of the congestion in the switch, until another resource management cell with the congestion indication information indicating an absence of the congestion in the switch is detected by the second means.

30. The system of claim 29, wherein the prescribed threshold used by the fifth means is determined according to the first cell transmission rate value stored by the first means, when the second cell transmission rate value detected by the second means is larger than the first cell transmission rate value stored by the first means.

31. The system of claim 29, wherein the fifth means regulates the transfer of cells by modifying a value of the prescribed threshold to a lower threshold value autonomously when the congestion indication information detected by the second means indicates a presence of the congestion in the switch.

32. The system of claim 31, further comprising:

sixth means for overwriting a value based on the lower threshold value in the explicit cell rate field of the resource management cell returned by the second end-node, when the congestion indication information detected by the second means indicates a presence of the congestion in the switch, regardless of whether the second cell transmission rate value is rewritten into the first cell transmission rate value by the third means.

33. The system of claim 32, further comprising:

seventh means for estimating a time period required since the resource management cell is transmitted from the system to the first end-node after a value based on the lower threshold value is overwritten by the sixth means until a cell transmitted by the first end-node after the resource management cell reached the first end-node arrives at the system;

wherein the fifth means starts regulating the transfer of cells using the lower threshold value after the time period estimated by the seventh means elapsed since the resource management cell is transmitted from the system.

34. The system of claim 25, further comprising:

eighth means for monitoring a cell transmission rate of cells transferred from the second end-node to the first end-node through the second virtual connection; and ninth means for regulating transfer of cells in the second virtual connection when the cell transmission rate monitored by the eighth means exceeds a prescribed threshold.

35. The system of claim 34, wherein the first end-node transmits the resource management cell at regular intervals while cells are transmitted from the second end-node to the first end-node, and the second means detects the second cell transmission rate value while the eighth means monitors the cell transmission rate of the cells in the second virtual connection.

36. The system of claim 25, further comprising:

tenth means for estimating a time period required since the first cell transmission rate value is stored from the resource management cell transmitted in the first virtual connection by the first means until the second cell transmission rate value is detected from the resource management cell returned in the second virtual connection by the second means; and eleventh means for selecting the first cell transmission rate value stored by the first means earlier than the time period estimated by the tenth means before a time of detecting the second cell transmission rate value by the second means, as the first cell transmission rate value used in judging whether the second cell transmission rate value is larger than the first cell transmission rate value by the third means.

37. A method for controlling a cell transmission rate in an ATM network having first and second end-nodes for carrying out transmission and reception of cells, a switch for transferring cells, a first virtual connection for transferring cells from the first end-node to the second end-node via the switch, and a second virtual connection for transferring cells from the second end-node to the first end-node via the switch, wherein a resource management cell having an explicit cell rate field for entering a desired cell transmission rate value of the switch or the second end-node is transmitted from the first end-node to the second end-node through the first virtual connection, and the resource management cell is returned from the second end-node to the first end-node through the second virtual connection, the method comprising the steps of:

storing a first cell transmission rate value written in the explicit cell rate field of the resource management cell transmitted by the first end-node;

detecting a second cell transmission rate value written in the explicit cell rate field of the resource management cell returned by the second end-node; and rewriting the second cell transmission rate value to be the first cell transmission rate value stored by the storing step in the explicit cell rate field of the resource management cell returned by the second end-node, when the second cell transmission rate value is larger than the first cell transmission rate value.

38. The system of claim 13, wherein the first and second end-nodes are provided at end points of the first and second virtual connections.

39. The system of claim 13, wherein the first and second end-nodes are switch devices provided on the first and second virtual connections.

* * * * *